United States Patent [19]
Lorek et al.

[11] Patent Number: 5,323,434
[45] Date of Patent: Jun. 21, 1994

[54] FUEL ASSEMBLY FOR A BOILING WATER NUCLEAR REACTOR

[75] Inventors: Pierre Lorek; Mahdi Majed; Bertil Schölin, all of Västerås, Sweden

[73] Assignee: ABB Atom AB, Västerås, Sweden

[21] Appl. No.: 33,346

[22] Filed: Mar. 18, 1993

[30] Foreign Application Priority Data

Mar. 31, 1992 [SE] Sweden ................ 9200997

[51] Int. Cl.$^5$ ............................................ G21C 3/32
[52] U.S. Cl. .................................... 376/435; 376/419; 376/428
[58] Field of Search ................ 376/435, 419, 428

[56] References Cited

U.S. PATENT DOCUMENTS 4,664,882  5/1987  Doshi .................. 376/435

Primary Examiner—Donald P. Walsh
Assistant Examiner—Frederick H. Voss
Attorney, Agent, or Firm—Watson, Cole, Grindle & Watson

[57] ABSTRACT

A fuel assembly for a boiling water nuclear reactor contains a plurality of vertical fuel rods, which are arranged between a bottom-tie plate and a top-tie plate (12) in a surrounding vertical casing part. The fuel rods extend through a number of spacers which are arranged in a spaced relationship in the vertical direction and which together with the bottom-tie plate and the top-tie plate retain the fuel rods in a spaced relationship in the lateral direction. The fuel assembly is designed for conducting water in through the bottom-tie plate, through the space between the fuel rods in the vertical casing part, and out through the top-tie plate. To counteract unfavourable temperatures caused by dryout, each fuel rod, in at least a majority of the fuel rods, is adapted to give off a considerably lower power in those parts of the fuel rod which are located immediately below the spacers in at least the uppermost one-third of the active length of the fuel rod than in the remaining parts of the active length of the fuel rod.

5 Claims, 3 Drawing Sheets

FIG. 4
FIG. 6
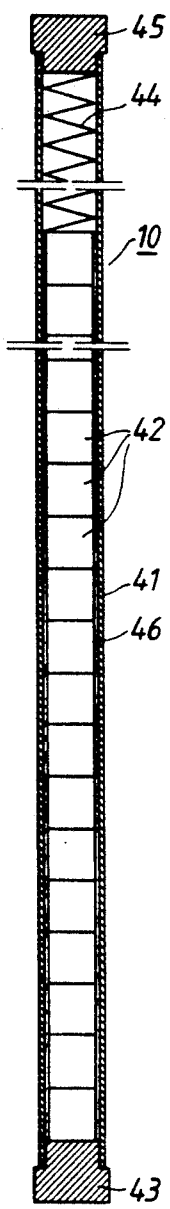
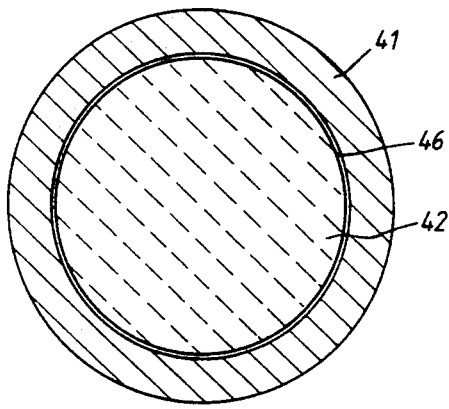
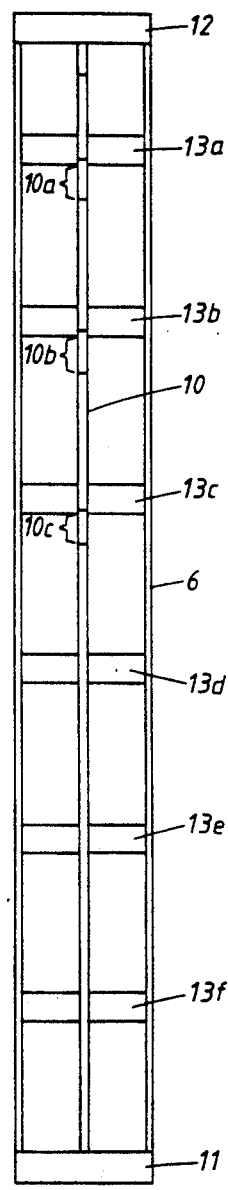
FIG. 5

FUEL ASSEMBLY FOR A BOILING WATER NUCLEAR REACTOR

BACKGROUND OF THE INVENTION

The present invention relates to a fuel assembly for a nuclear reactor of boiling water type containing a plurality of vertical fuel rods, which are arranged between a bottom-tie tie plate and a top-tie plate in a surrounding vertical casing part and which extend through a number of spacers which are arranged in spaced relationship in the vertical direction and which together with the bottom-tie plate and the top-tie plate retain the fuel rods in a spaced relationship in a lateral direction. Each fuel rod in the fuel assembly comprises a cladding tube containing a nuclear fuel material and the fuel assembly is formed with an inlet for water for conducting water in through the bottom-tie plate, through the space between the fuel rods in the vertical casing part, and out through the top-tie plate.

In the operation of a nuclear reactor with a core containing several fuel assemblies of the above-mentioned kind, there may be a risk of so-called dryout occurring, that is to say the disappearance or breaking down in limited regions of the water film which is present on the surface of each fuel rod, which locally leads to a considerably deteriorated heat transfer between the fuel rod and the water conducted through the fuel assembly, resulting in a greatly increased wall temperature of the fuel rod. The increased wall temperature may lead to damage with serious consequences arising on the fuel rod.

SUMMARY OF THE INVENTION

The present invention is based on the realization that the risk of the occurrence of the unfavourable events described above, caused by the occurrence of dryout, can be eliminated or considerably counteracted if measures are taken to maintain the power emission of the fuel rod, in defined regions along the extent of the fuel rod, sufficiently low to prevent the occurrence of dryout there, or to prevent damage from arising on the fuel rod, even if dryout should occur there. The regions on the fuel rod where the power emission needs to be maintained low are, according to the invention, the regions immediately below the spacers in the upper part of the fuel assembly. In these regions a redistribution of the flow takes place because of the blocking of the flow by the spacers, which may result in an increased risk of breakdown of the water film existing in these very positions.

What characterizes the present invention is that in at least the main part (i.e., a majority) of the fuel rods, each fuel rod is adapted to give off a considerably lower power in those parts of the fuel rods, which are located immediately below the spacers in at least the uppermost one-third of the active length of the fuel rod, as compared to the power that the fuel rod is adapted to give off in the remainder of the active length of the fuel rod. By the active length of the fuel rod is meant in this patent application that axial part of the fuel rod which contains nuclear fuel material.

Each one of those parts of a fuel rod, which is adapted to give off a considerably lower power, suitably has a length of 2-10 cm and is suitably adapted to give off a power which is at most one-third of the power which the fuel rod is adapted to give off, on average, in the remaining parts of its active length. Preferably, this part has a length of 3-8 cm and is adapted to give off a power of at most one-fourth of the power which the fuel rod is adapted to give off, on average, in the remaining parts of its active length.

The lower power in the above-mentioned part of a fuel rod can be achieved by the use of a nuclear fuel material in this part, for example of the same kind as in the rest of the fuel rod but provided with a burnable absorber, for example $Gd_2O_3$. It may also be achieve, inter alia, by the use of a non-fissile material with a low neutron absorption, for example zirconium or a zirconium alloy such as Zircaloy.

The invention will be explained in greater detail by describing an embodiment with reference to the accompanying drawings.

BRIEF DESCRIPTION OF THE DRAWINGS

FIG. 4 shows a fuel rod in the fuel assembly in vertical section, FIG. 5 shows the same fuel rod in a section perpendicular to the symmetry axis on an enlarged scale, and FIG. 6 shows a schematic picture of only the vertical casing part of a whole fuel assembly with all the spacers in the fuel assembly but with only one of the fuel rods for clarity.

DETAILED DESCRIPTION OF THE PREFERRED EMBODIMENTS

Figure 1:
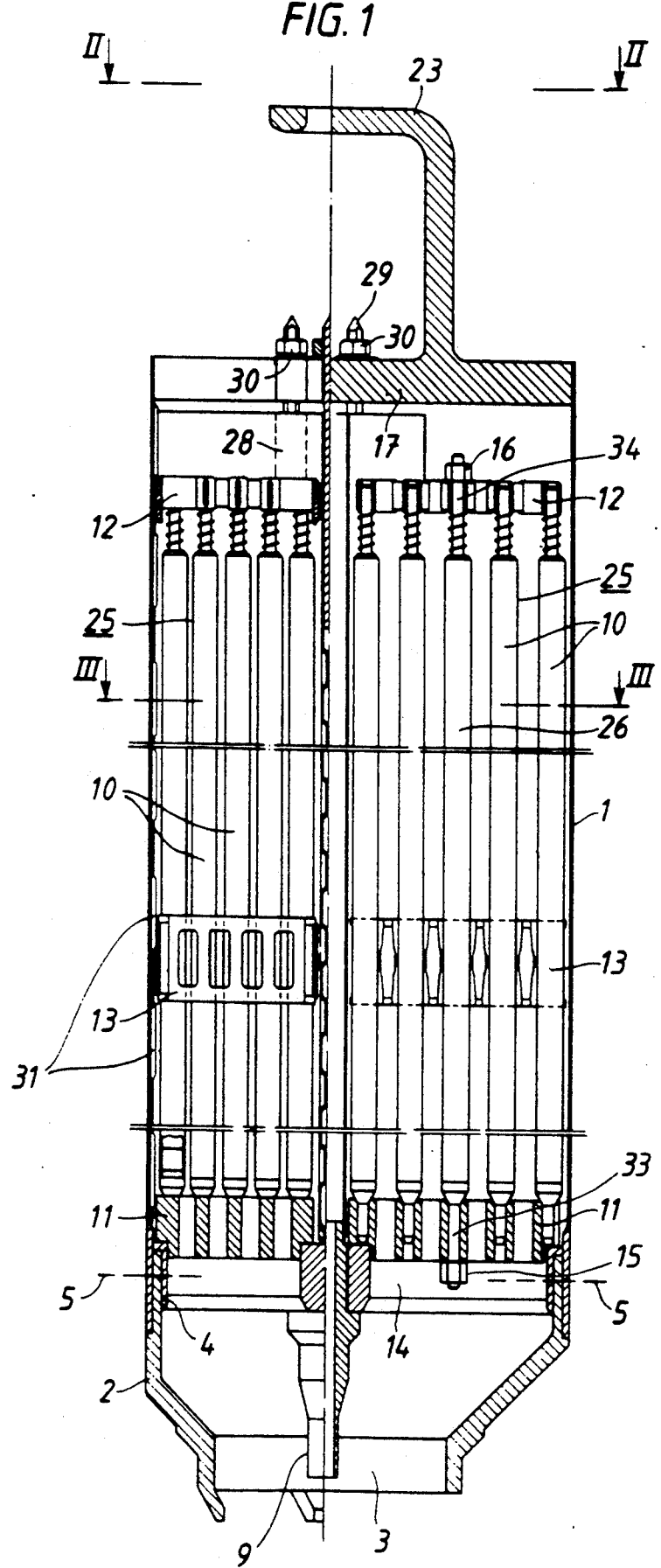
FIG. 1 shows in vertical section through the line I—I in FIG. 2 of an embodiment of a composed fuel assembly with four fuel assemblies according to the invention.
Figure 2:
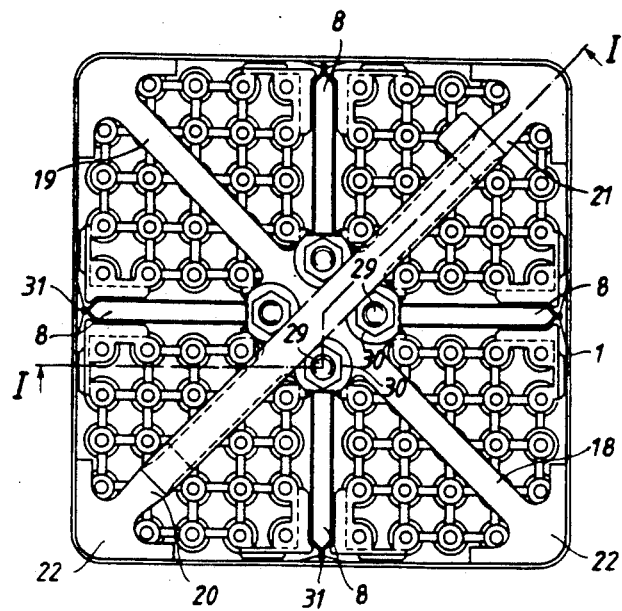
FIG. 2 shows the same composed fuel assembly in a view perpendicular to a horizontal plane through the line II—II in FIG. 1.
Figure 3:
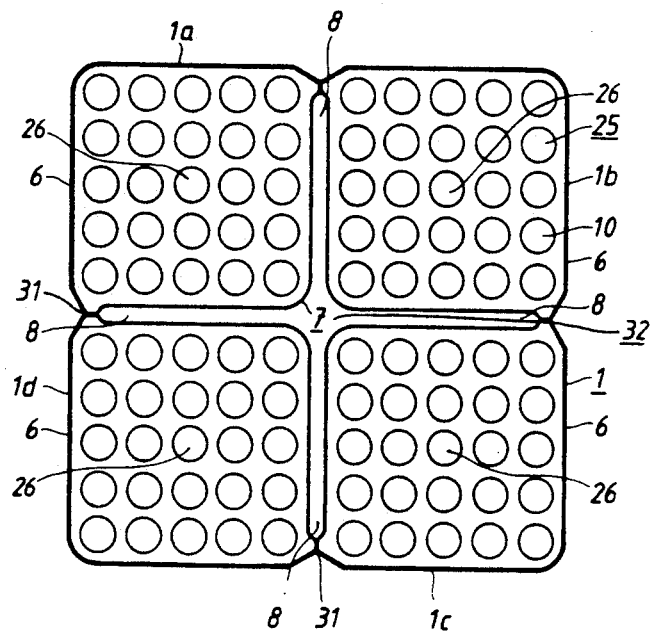
FIG. 3 shows a horizontal section through the line III—III in FIG. 1.

In FIGS. 1-3, 1 designates a fuel channel of substantially square cross section. The fuel channel surrounds with no mentionable play an upper, square portion of a bottom part 2 with a circular, downwardly facing inlet opening 3 for cooling water and moderator water. The bottom part 2 supports, in addition to the fuel channel 1, a supporting plate 4. At its lowest part the fuel channel 1 has a relatively thick wall portion which is fixed to the bottom part 2 and the supporting plate 4 by means of a plurality of horizontal bolts, indicated by means of dash-dotted lines 5. The fuel channel 1 is divided, by means of a hollow support member 7 of cruciform cross section, into four vertical tubular parts 6 with at least substantially square cross section. The support member 7 is welded to the four walls 1a, 1b, 1c and 1d of the fuel channel and has four hollow wings 8. The cruciform channel formed from the support member is designated 32 and is connected at its lowest part to an inlet tube 9 for moderator water. Each tubular part 6 comprises a bundle 25 containing twenty-five fuel rods 10. The rods are arranged in a symmetrical lattice in five rows each containing five rods. Each rod is included in two rows perpendicular to each other. Each bundle is arranged with a bottom-tie plate 11, a top-tie plate 12 and a plurality of spacers 13. A fuel rod bundle 25 with a bottom-tie plate 11, a top-tie plate 12, a spacer 13 and a casing part 6 forms a unit which in this application is referred to as fuel assembly, whereas the device illustrated in FIGS. 1-3 comprising four such fuel assemblies is referred to as a composed fuel assembly. The four bottom-tie plates 11 are supported in the composed fuel assembly by the supporting plate 4 and are each partially inserted into a respective square hole 14 in this plate. In each fuel assembly at least one of the fuel rods is designed with relatively long, threaded end plugs 33 and 34 of solid cladding material, the lower end plug 33 being passed through the bottom-tie plate 11 and provided with a nut 15, the upper end plug 34 being passed through the top-tie plate 12 and provided with a nut 16. In the embodiment shown, the centre rod 26 is designed in this way. This rod also serves as a spacer holder rod. An upper end portion of the fuel channel 1 surrounds a cruciform lifting plate 17 with four horizontal arms 18, 19, 20 and 21, which extend from a common central portion. At the outer end each arm has an arrow-head-like portion 22 which, in respective corners of the fuel channel 1, makes contact with the inner wall surface of the fuel channel 1. A lifting handle 23 is fixed to the arms 20 and 21. The lifting plate 17 and the handle 23 together form a lifting member of steel cast in one piece. The lifting plate 17 is fixed to the support member 7 by inserting each of four vertical bars 28 into a respective wing 8 of the support member 7 and welding them thereto. At the top each bar 28 has a vertical, bolt-like portion 29 which is passed with a play through a corresponding hole in the mid-portion of the lifting plate 17 and provided with a nut 30. As will be clear from the figures, the fuel channel 1 is provided with indentations 31, intermittently arranged in the longitudinal direction, to which the support member 7 is welded.

As is clear from FIGS. 4 and 5, each fuel rod 10 includes a cladding tube 41 which is of a zirconium alloy, such as Zircaloy 2. The cladding tube has a length of about 4 m, and in it about 300 circular-cylindrical pellets 42 are stacked one above the other in the axial direction of the tube. The pellets have a height of 11 mm and a diameter of 8.0 mm. Except those pellets located nearest to each end of the fuel rods, which pellets consist of oxide of natural uranium, and except those pellets located immediately below the uppermost spacers, the pellets conventionally consist of uranium dioxide enriched with respect to U 235. The lowermost pellet rests rigidly on an end plug 43 welded to the lower end of the rod and the uppermost pellet is pressed downwards by a spiral spring 44 which is tensioned against an end plug 45 welded to the upper end of the tube. The pellets are ground such that a play 46 arises between the envelope surface of the pellet and the inner wall of the cladding tube. The fuel rod is filled with helium under pressure. In the embodiment shown, the center rod 26, instead of constituting a supporting fuel rod and spacer holder rod, may be designed as a water-filled supporting rod and/or spacer holder rod. Also occasional other rods in each sub-bundle may be formed as water-filled rods instead of as fuel rods.

The fuel assembly schematically shown in FIG. 6 has, in the exemplified case, six spacers 13a-f. In accordance with the present invention, each one of at least a majority of the fuel rods 10, and preferably of all the fuel rods is adapted to give off a considerably lower power in those parts 10a and 10b which are located immediately below the spacers 13a and 13b in the uppermost one-third of the active length of the fuel rod than in the remaining parts of the active length of the fuel rod. In the exemplified case, the parts 10a and 10b have a length of 6 cm and are adapted to give off a power of about 4 kW/m. The power given off by the remaining parts of the active length of the fuel rod amounts, on average, to around 20 kW/m. Whereas the pellets 42 (FIG. 4) in the fuel rod, except in parts 10a and 10b in the exemplified case, consist of uranium dioxide with a medium enrichment of 3.5% U 235 of the initial weight uranium in the fuel, the nuclear fuel material in parts 10a and 10b consists of uranium dioxide with an enrichment of 0.35% U 235. Instead of using, in parts 10a and 10b, a mixture of a fissile material and burnable absorber, it is possible to use a material with a low neutron absorption, for example Zircaloy. However, it is advantageous to use a mixture of the kind mentioned, whereby the content of burnable absorber is preferably adapted such that it is consumed after the first cycles with intermediate partial recharging of the reactor core. The fissile material can then be utilized in full during the operating period that remains until the fuel assembly is removed from the core, since there is no risk of dryout after the first cycles mentioned. Under certain conditions it may be advantageous to arrange, also in the part 10c below the spacer 13c, a material of the same kind as in the parts 10a and 10b. The part 10c is arranged in the upper half of the active length of the fuel rod.

If the parts 10a, 10b and the parts 10a, 10b and 10c, respectively, are adapted to give off no, or very low, power, it may be suitable to arrange the nuclear fuel material immediately outside these parts, on both sides, to give off a somewhat lower power than the rest of the nuclear fuel material outside these parts. In this way it can be ensured that no power peak occurs when changing from a nuclear fuel material with no or low power to a nuclear fuel material with considerably higher power.

We claim:

1. A fuel assembly for a boiling water nuclear reactor containing a plurality of vertical fuel rods which are arranged between a bottom-tie plate and a top-tie plate in a surrounding vertical casing part and which extend through a plurality of spacers arranged in spaced relationship in the vertical direction, said spacers together with the bottom-tie plate and the top-tie plate retaining the fuel rods in a spaced relationship in a lateral direction, wherein each fuel rod comprises a cladding tube containing a nuclear fuel material along an active length thereof and wherein the fuel assembly is formed with an inlet for water for conducting water in through the bottom-tie plate, through the space between the fuel rods in the vertical casing part, and out through the top-tie plate, wherein each fuel rod of at least a majority of said plurality fuel rods is adapted to provide a considerably lower power in parts thereof which are located immediately below the associated spacers in at least an uppermost one-third of the active length of the fuel rod as compared to the power the fuel rod is adapted to provide in the remaining parts of the active length thereof.

2. A fuel assembly according to claim 1, wherein a part of a fuel rod which is adapted to give off a lower power has a length of 2-10 cm.

3. A fuel assembly according to claim 1 wherein a part of a fuel rod which is adapted to provide a lower power is adapted to provide a power which is at most one-third of the power which the fuel rod is adapted to provide, on average, in the remaining parts of its active length.

4. A fuel assembly according to claim 1, wherein a part of a fuel rod which is adapted to give off a lower power is adapted to comprise a nuclear fuel material which is surrounded by a corresponding part of the cladding tube and which contains a burnable absorber.

5. A fuel assembly according to claim 1, wherein a part of a fuel rod which is adapted to provide a lower power is adapted to comprise a non-fissile material with low neutron absorption which is surrounded by a corresponding part of the cladding tube.

* * * * *